United States Patent
Frank

(10) Patent No.: US 7,994,482 B2
(45) Date of Patent: Aug. 9, 2011

(54) RADIATION DIRECTIONAL FINDER AND ISOTOPE IDENTIFICATION SYSTEM

(75) Inventor: David L. Frank, Boca Raton, FL (US)

(73) Assignee: Innovative American Technology, Inc., Coconut Creek, FL (US)

(*) Notice: Subject to any disclaimer, the term of this patent is extended or adjusted under 35 U.S.C. 154(b) by 269 days.

(21) Appl. No.: 12/468,334

(22) Filed: May 19, 2009

(65) Prior Publication Data
US 2009/0294678 A1    Dec. 3, 2009

Related U.S. Application Data

(60) Provisional application No. 61/128,114, filed on May 19, 2008, provisional application No. 61/070,590, filed on Mar. 24, 2008, provisional application No. 61/128,115, filed on May 19, 2008, provisional application No. 61/208,492, filed on Feb. 25, 2009, provisional application No. 61/210,075, filed on Mar. 13, 2009, provisional application No. 61/209,194, filed on Mar. 4, 2009, provisional application No. 61/210,122, filed on Mar. 13, 2009, provisional application No. 61/210,234, filed on Mar. 16, 2009.

(51) Int. Cl.
*G01T 1/24* (2006.01)
*G01T 3/08* (2006.01)

(52) U.S. Cl. .............. 250/370.1; 250/370.05; 250/394

(58) Field of Classification Search .......... 250/370.01, 250/370.05, 370.1, 394
See application file for complete search history.

(56) References Cited

U.S. PATENT DOCUMENTS

| | | | |
|---|---|---|---|
| 4,158,773 A | 6/1979 | Novak |
| 4,799,828 A | 1/1989 | Georgii |
| 5,056,958 A | 10/1991 | Campbell |
| 5,241,573 A | 8/1993 | Thacker |
| 5,633,508 A | 5/1997 | Schleppenbach |
| 5,665,970 A | 9/1997 | Kronenberg et al. |
| 5,838,759 A | 11/1998 | Armistead |

(Continued)

FOREIGN PATENT DOCUMENTS

KR    10-1992-7004134    12/1992

(Continued)

OTHER PUBLICATIONS

U.S. Appl. No. 11/291,574, filed Dec. 2005, Frank.

(Continued)

*Primary Examiner* — David P Porta
*Assistant Examiner* — Mark R Gaworecki
(74) *Attorney, Agent, or Firm* — Jose Gutman; Fleit Gibbons Gutman Bongin & Bianco PL

(57) ABSTRACT

A system and method determine a direction associated with gamma and/or neutron radiation emissions. A first radiation photon count associated with a first detector in a detector set is received from the first detector. The first radiation photon count is associated with at least one radiation source. A second radiation photon count associated with a second detector in the detector set is received from the second detector. The first radiation photon count is compared to the second radiation photon count. One of the first detector and the second detector is identified to have detected a larger number of radiation photons than the other. The at least one radiation source is determined to be substantially in a direction in which the one of the first detector and the second detector that has detected the larger number of radiation photons is facing.

20 Claims, 6 Drawing Sheets

U.S. PATENT DOCUMENTS

| | | | |
|---|---|---|---|
| 6,370,222 B1 | 4/2002 | Cornick | |
| 6,433,335 B1 | 8/2002 | Kronenberg et al. | |
| 6,479,826 B1 | 11/2002 | Klann et al. | |
| 6,545,281 B1 | 4/2003 | McGregor et al. | |
| 6,845,873 B1 | 1/2005 | Chattey | |
| 6,891,470 B2 | 5/2005 | Bohinc | |
| 6,937,692 B2 | 8/2005 | Johnson | |
| 6,980,483 B2 | 12/2005 | McDonald | |
| 6,998,617 B2 | 2/2006 | D'Emilio et al. | |
| 7,026,944 B2 | 4/2006 | Alioto et al. | |
| 7,030,755 B2 | 4/2006 | Bohinc | |
| 7,064,333 B2 * | 6/2006 | Torii | 250/361 R |
| 7,064,336 B2 | 6/2006 | Archer et al. | |
| 7,116,235 B2 | 10/2006 | Alioto et al. | |
| 7,151,447 B1 | 12/2006 | Willms et al. | |
| 7,183,554 B2 | 2/2007 | Gallagher et al. | |
| 7,356,115 B2 | 4/2008 | Ford et al. | |
| 2002/0175291 A1 | 11/2002 | Reeder et al. | |
| 2003/0108150 A1 | 6/2003 | Franke | |
| 2003/0144800 A1 | 7/2003 | Davis et al. | |
| 2003/0165211 A1 | 9/2003 | Lee et al. | |
| 2003/0201394 A1 | 10/2003 | Peoples | |
| 2004/0018060 A1 | 1/2004 | Knezek et al. | |
| 2004/0054248 A1 * | 3/2004 | Kimchy et al. | 600/3 |
| 2004/0119591 A1 | 6/2004 | Peeters | |
| 2004/0126895 A1 | 7/2004 | Overbeck et al. | |
| 2004/0148137 A1 | 7/2004 | Zerwekh et al. | |
| 2005/0011849 A1 | 1/2005 | Chattey | |
| 2005/0023477 A1 | 2/2005 | Archer et al. | |
| 2005/0082485 A1 | 4/2005 | Tatsuo | |
| 2005/0156734 A1 | 7/2005 | Zerwekh et al. | |
| 2005/0205793 A1 | 9/2005 | Bohinc | |
| 2005/0220247 A1 | 10/2005 | Ruddy et al. | |
| 2005/0258372 A1 | 11/2005 | McGregor et al. | |
| 2005/0275545 A1 | 12/2005 | Alioto et al. | |
| 2006/0097171 A1 | 5/2006 | Balchunas et al. | |
| 2006/0138331 A1 | 6/2006 | Guillebaud et al. | |
| 2006/0284094 A1 | 12/2006 | Inbar | |
| 2007/0001123 A1 | 1/2007 | Andrews et al. | |

FOREIGN PATENT DOCUMENTS

| | | |
|---|---|---|
| KR | 10-1005-0067392 | 7/2005 |
| WO | WO98-00681 | 1/1998 |
| WO | WO2006-085999 | 8/2006 |

OTHER PUBLICATIONS

U.S. Appl. No. 11/363,594, filed Feb. 2006, Frank.
U.S. Appl. No. 11/564,193, filed Nov. 2006, Frank.
U.S. Appl. No. 11/931,370, filed Oct. 2007, Frank.
International Preliminary Report on Patentabiilty for PCT/US06/46255 mailed Sep. 24, 2008.
International Search Report and Written Opinion of the International Searching Authority for PCT/US06/46255 mailed Sep. 25, 2007.
Written Opinion of the International Searching Authority for PCT/US07/085578 dated Jan. 23, 2009.
International Search Report for PCT/US07/085578 dated Jan. 23, 2009.
PCT Application No. PCT/US2007/085578 filed Nov. 27, 2007.
PCT Application No. PCT/US2006/46255 filed Nov. 30, 2006.
Non-Final Rejection for U.S. Appl. No. 11/291,574 dated Dec. 2, 2008.
Final Rejection for U.S. Appl. No. 11/291,574 dated Mar. 20, 2008.
Notice of Allowance for U.S. Appl. No. 11/291,574 dated May 20, 2009.
Non-Final Rejection for U.S. Appl. No. 11/363,594 dated Aug. 23, 2006.
Notice of Allowance for U.S. Appl. No. 11/363,594 dated Sep. 27, 2006.
Non-Final Rejection for U.S. Appl. No. 11/564,183 dated Jun. 25, 2009.
Non-Final Rejection for U.S. Appl. No. 11/931,370 dated Dec. 12, 2008.
Final Rejection for U.S. Appl. No. 11/931,370 dated Sep. 9, 2009.
Final Rejection for U.S. Appl. No. 11/564,193 dated Jan. 8, 2010.
Notice of Allowance for U.S. Appl. No. 11/930,229 dated Apr. 7, 2010.
International Search Report and Written Opinion for PCT/US09/050299 dated Mar. 3, 2010.
Notice of Allowance for U.S. Appl. No. 11/931,370 dated Mar. 30, 2010.
International Search Report for PCT/US09/038064 dated Jul. 31, 2009.
International Search Report and Written Opinion for PCT/US09/044486 dated Dec. 23, 2009.
International Search Report and Written Opinion for PCT/US09/044475 dated Jan. 6, 2010.
International Search Report and Written Opinion for PCT/US09/045268 dated Jan. 29, 2010.
International Search Report and Written Opinion for PCT/US09/044494 dated Jan. 18, 2010.
Non-Final Rejection for U.S. Appl. No. 11/931,211 dated Apr. 30, 2010.
International Search Report and Written Opinion dated Jan. 6, 2010 for PCT/US2009/044475.

* cited by examiner

RADIATION DIRECTIONAL FINDER AND ISOTOPE IDENTIFICATION SYSTEM

CROSS-REFERENCE TO RELATED APPLICATIONS

This application is based on and claims priority to co-pending provisional U.S. Patent Application No. 61/128,114, entitled "Radiation Directional Finder and Isotope Identification System", filed on May 19, 2008, by the same inventor, and to co-pending U.S. patent application Ser. No. 12/409,733, entitled "Mobile Radiation Threat Identification System", filed on Mar. 24, 2009, by the same inventor, which is based on and claims priority to previously co-pending, and now expired, provisional U.S. Patent Application No. 61/070,590, entitled "Marine and Vehicle Mobile Radiation Threat Identification System", filed on Mar. 24, 2008, by the same inventor, and this application is further based on and claims priority to co-pending provisional U.S. Patent Application No. 61/128,115, entitled "Mobile Frame Structure With Passive/Active Sensor Arrays For Non-Invasive Analysis For CBRNE Materials Present", filed on May 19, 2008, by the same inventor, and to co-pending provisional U.S. Patent Application No. 61/208,492, entitled "Method For Increased Gamma/Neutron Detector Performance", filed on Feb. 25, 2009, by the same inventor, and to co-pending provisional U.S. Patent Application No. 61/210,075, entitled "Method For Increased Gamma/Neutron Detector Performance", filed on Mar. 13, 2009, by the same inventor, and to co-pending provisional U.S. Patent Application No. 61/209,194, entitled "High Performance Neutron Detector With Near Zero Gamma Cross Talk", filed on Mar. 4, 2009, by the same inventor, co-pending provisional U.S. Patent Application No. 61/210,122, entitled "High Performance Neutron Detector With Near Zero Gamma Cross Talk, version 2", filed on Mar. 13, 2009, by the same inventor, and co-pending provisional U.S. Patent Application No. 61/210,234, entitled "High Performance Neutron Detector With Near Zero Gamma Cross Talk, version-3", filed on Mar. 16, 2009, by the same inventor; the entire collective teachings of which being incorporated herein by reference.

FIELD OF THE INVENTION

The present invention generally relates to the field of radiation detection, and more particularly relates identifying a direction of radiation emanation and identifying isotopes associated with the radiation.

BACKGROUND OF THE INVENTION

Radiation detection systems are currently being deployed throughout the world to help prevent catastrophic events. Some radiation detection systems utilize radiation directional detectors that try to identify the direction in which radiation is being emanated. Current radiation directional detectors use heavy shielding behind each detector to focus the detection in a specific direction. Other systems also deploy collimators to assist in directional detection. One type of radiation detector is a plastic scintillator, which has a low cost. Plastic scintillators can provide very large surface areas, which with optimal width is good for long distance detection. However, plastic scintillators do not have the ability to perform spectral analysis. Therefore, system based on plastic scintillators generally cannot identify the source of radiation, which can be naturally occurring radiation material (NORM).

Most current directional detector systems employ heavy metals for shielding that are in addition to the overall weight and cost. Another radiation detection method is to combine multiple detectors to define the vector of the photon. This method requires more than two detectors per direction to identify the photon vector. Another recent design uses four Cerium Doped Lanthanum Bromide (LaBr3:Ce) Scintillation detectors with high resolution capabilities to determine the vector of the radiation source. These specialized detectors are extremely expensive with crystals that cannot be grown to accommodate large surface area detectors. The Labr3:Ce scintillators have very strong identification capabilities, due to high resolution of Labr3:Ce detectors, but the high cost and limits in available detector crystal sizes makes them impractical to use. Labr3:Ce scintillators have 180 degree symmetry. This means that Labr3:Ce scintillators cannot identify difference between a source in front of detector or with a same angle behind the detector.

The deficiencies of the current systems available do not address the needs of critical security applications. The current methods for creating directional radiation detectors are too costly, bulky or have heavy weight factors. In addition, the current radiation detection methods do not offer a combined stand-off detection, directional finder, position locator, radiation source movement tracking and isotope identification in a cost effective, light weight, and efficient approach that does not require highly specialized detector performance characteristics.

Therefore a need exists to overcome these problems as discussed above

SUMMARY OF THE INVENTION

In one embodiment, a method for determining a direction associated with gamma and/or neutron radiation emissions is disclosed. The method includes determining receiving from a first detector a first radiation photon count (e.g., gamma particle count and/or neutron particle count) determined by the first detector in a detector set. The first radiation photon count is associated with at least one radiation source. A second radiation photon count (e.g., gamma particle count and/or neutron particle count) determined by a second detector in the detector set is received from the second detector. The second radiation photon count is associated with the at least one radiation source. The first radiation photon count is compared to the second radiation photon count. One of the first detector and the second detector is identified to have detected a larger number of radiation photons than the other based on the comparing. The at least one radiation source is determined to be in a direction that is substantially identical to a direction in which the one of the first detector and the second detector that has detected the larger number of radiation photons is facing based on the identifying.

In another embodiment, a frame structure comprising at least a first portion and a second portion configured to receive an object therebetween, for determining a direction associated with gamma and/or neutron radiation emitting from the object is disclosed. The object may include, for example, a shipping container for containing cargo, a storage device, or any type of object that could be suspect for including a radiation source. The frame structure can comprise any type of frame structure that can be mechanically coupled to such an object. For example, and not for limitation, the frame structure may comprise any of a gantry crane, a spreader bar, a forklift, a straddle carrier, and generally any type of vehicle such as a truck, automobile, marine vessel, airplane, and the like, and any type of fixed frame structure, such as a portal that vehicles/containers pass through. The frame structure includes at least one set of radiation detectors. The at least one set of radiation detectors includes a first detector and at least a second detector. The first detector and the at least second detector are mechanically coupled together in a configuration such that each detector shields the other detector from detected radiation emissions. A body portion of the first detector is mechanically coupled to a body portion of the at least second detector so that the first detector and the at least second detector are adjacent to each other. A sensing portion of the first detector and a sensing portion of the at least second detector face opposite directions. The frame structure also includes at least one information processing system coupled to the at least one set of radiation detectors. The at least one information processing system is adapted to receive from a first detector a first radiation photon count determined by the first detector in a detector set. The first radiation photon count is associated with at least one radiation source. A second radiation photon count determined by a second detector in the detector set is received from the second detector. The second radiation photon count is associated with the at least one radiation source. The first radiation photon count is compared to the second radiation photon count. One of the first detector and the second detector is determined to have detected a larger number of radiation photons than the other based on the comparing of the first and second counts. The at least one radiation source is determined to be in a direction that is substantially identical to a direction in which the one of the first detector and the second detector that has detected the larger number of radiation photons is facing based on the identifying.

In yet another embodiment, a system determines a direction associated with gamma and/or neutron radiation emitting from the object. The system includes at least one structure and at lest one network. The structure includes at least a first portion and a second portion configured to receive an object therebetween, for determining a direction associated with gamma and/or neutron radiation emitting from the object. The frame structure includes at least one set of radiation detectors. The at least one set of radiation detectors includes a first detector and at least a second detector. The first detector and the at least second detector are mechanically coupled together in a configuration such that each detector shields the other detector from detected radiation emissions. A body portion of the first detector is mechanically coupled to a body portion of the at least second detector so that the first detector and the at least second detector are adjacent to each other. A sensing portion of the first detector and a sensing portion of the at least second detector face opposite directions. The system also includes at least one information processing system communicatively coupled to the network and the at least one set of radiation detectors. The at least one information processing system is adapted to receive from a first detector a first radiation photon count determined by the first detector in a detector set. The first radiation photon count is associated with at least one radiation source. A second radiation photon count determined by a second detector in the detector set is received from the second detector. The second radiation photon count is associated with the at least one radiation source. The first radiation photon count is compared to the second radiation photon count. One of the first detector and the second detector is identified to have detected a larger number of radiation photons than the other based on the comparing. The at least one radiation source is determined to be in a direction that is substantially identical to a direction in which the one of the first detector and the second detector that has detected the larger number of radiation photons is facing based on the identifying.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Operating Environment

Figure 1:
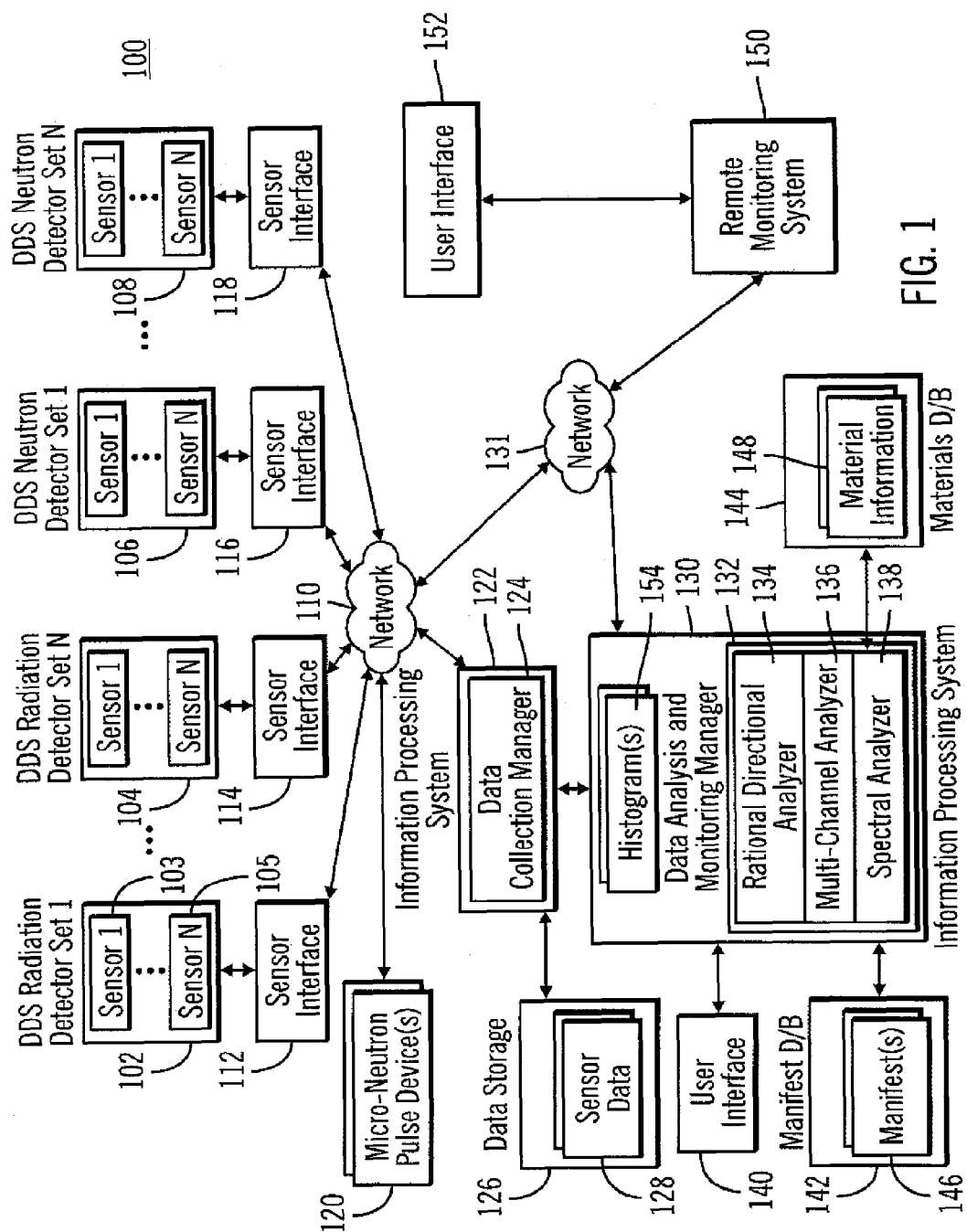
FIG. 1 is a block diagram illustrating a general overview of an operating environment according to one embodiment of the present invention.

According to one embodiment of the present invention as shown in FIG. 1 a general view of an operating environment 100 is illustrated. The operating environment 100 enables stand-off radiation detection, determination of the direction of the emanating radiation source, and isotope identification. As discussed in greater detail below, the operating environment 100 implements a plurality of radiation detectors that are coupled together in a back-to-back configuration to create a directional detector. With this type of configuration shielding material is not required, as each coupled detector acts as a shield for an opposing detector.

Two or more sets of back-to-back or "sandwiched" detectors are used to form a radiation directional finder and identifier ("RDFI"). By using two sets of back-to-back coupled detectors, with each set aligned at substantially 90 degrees to the other, the detection data from all of the detectors can be used to detect radiation at stand-off distances in a 360 degree view and determine the direction of the emanating radiation source. A stand-off distance is defined as at least 100 feet from the detectors to a potential threat, which in this example is a radiation source. RDFI's can be deployed on fixed or mobile platforms. The use of two or more fixed RDFI systems can be used to identify the position of the radiation source through triangulation. One or more mobile platforms can acquire data from two or more positions to identify the position of the radiation source through triangulation. Mobile and fixed platforms may be combined to provide the triangulation data. Note that each mobile RDFI system could include a GPS detector which can be used to identify a geographical location of the RDFI system detectors. This geographical location information can be combined with the triangulation information relative to the radiation source to accurately identify the position of the radiation source in a geographic region.

The operating environment 100 also enables the further collection of the RDFI spectral data that can be used for isotope identification of the radiation from the radiation source.

In particular, FIG. 1 shows one or more radiation detector sets 102, 104 and one or more neutron detector sets 106, 108 that are communicatively coupled to a first network 110. The radiation detector sets 102, 104, in one embodiment, are gamma detector sets. In one embodiment, at least one of the radiation detector sets 102, 104 and neutron detector sets 106, 108 are directional detection sets ("DDS"). A DDS radiation set includes two detectors coupled to one another in a back-to-back configuration. The DDS radiation sets and their configuration are discussed in greater detail below.

Each of the detector sets 102, 104, 106, 108 includes one or more detectors/sensors 103, 105. One or more of these detectors, in one embodiment, are shielded from electro-magnetic-interference ("EMI"), but this is not required. In one embodiment, the detectors 102, 105 of detector set(s) are gamma radiation detectors and the sensors 103, 105 in another detector set are neutron sensor devices. However, each of the detector sets 102, 104, 106, 108, 106, 108 can include a combination of gamma and neutron sensing devices as well.

Examples of radiation detectors are cadmium zinc telluride detectors, sodium iodide detectors, and the like. Neutron detectors can be solid-state neutron detectors, which provide shock resistance. Also, to assist in the detection of radiation at stand-off distances, according to certain embodiments of the invention, the gamma detectors may be equipped with collimators and/or lenses that gather the radiological particles and focus these particles onto the detectors. Shock resistance detectors are suitable for verifying radiation from objects that can move and cause shock/vibration hazards to the sensors. Each detector set 102, 104, 106, 108 is communicatively coupled to a sensor interface 112, 114, 116, 118 either by a wired and/or wireless communication link. The sensor interfaces 112, 114, 116, 118 communicatively couple the detector sets 102, 104, 106, 108 to the first network 110 thereby creating a distributed sensor network.

The first network 110 includes wired and/or wireless technologies and the sensor interface units 112, 114, 116, 118 are communicatively coupled to the first network 110 either wirelessly and/or via wired mechanisms. In one embodiment, the sensor interfaces 112, 114, 116, 118 assign a unique IP address to each of the detectors 103, 105 within the detector sets 102, 104, 106, 108. The sensor interfaces 112, 114, 116, 118, in one embodiment, are sensor integration units ("SIU") that provide the calibration, automated gain control, calibration verification, remote diagnostics, and connectivity to the processor for spectral analysis of the sensor data. SIUs are discussed in greater detail in U.S. Pat. No. 7,269,527 entitled "System integration module for CBRNE sensors", filed on Jan. 17, 2007, which is commonly owned and is hereby incorporated by reference in its entirety. It should be noted that although FIG. 1 shows each of the detector sets 102, 104, 106, 108 coupled to a separate sensor interface 112, 114, 116, 118 a single sensor interface can be coupled to all of the detector sets 102, 104, 106, 108.

One or more micro-neutron pulse devices 120 are also optionally included within the operating environment 100 and are communicatively coupled to the first network 110. A micro-neutron pulse device 120 is an active analysis device that emits neutron pulses and whereby gamma feedback identifies shielded radiological materials such as highly enriched uranium, explosives, illicit drugs, or other materials.

The operating environment 100 also includes an information processing system 122 communicatively coupled to the first network 110 via one or more wired and/or wireless communication links. The information processing system 122 includes a data collection manager 124 and is communicatively coupled to one or more data storage units 126. The one or more storage units 126 can reside within the information processing system 122 and/or outside of the system 122, as shown in FIG. 1. The data collection manager 124 manages the collection and/or retrieval of data 128 generated by the detectors/sensors 103, 105 within the detector sets 102, 104, 106, 108 and optionally the micro-neutron pulse device(s) 120.

The data 128 generated by each of the detectors 103, 105, in one embodiment, is detailed spectral data from each sensor device that has detected radiation such as gamma radiation and/or neutron radiation. The data collection manager 124, in one embodiment, stores the data 128 received/retrieved from the detector sets 102, 104, 106, 108 and/or the neutron pulse device 120 in one or more data storage devices 126. A data storage device 126 can be a single hard-drive, two or more coupled hard-drives, solid state memory devices, and/or optical media such as (but not limited to) compact discs and digital video discs, and the like. It should be noted that this list of storage devices is not exhaustive and any type of storage device can be used. It should also be noted that information processing system 122 including the data collection manager 124 is modular in design and can be used specifically for radiation detection and identification and/or for data collection for explosives and special materials detection and identification.

The operating environment 100, in one embodiment, also includes an information processing system 130 communicatively to the at least a second network 131 via one or more wireless and/or wired communication technologies. The information processing system 130, in one embodiment, includes a data analysis and monitoring manager 132 that analyzes and monitors the data 128 retrieved/received from the detector sets 102, 104, 106, 108 and optionally the micro-neutron pulse device 120. The data analysis and monitoring manager 132, in one embodiment, includes a radiation directional analyzer 134, a multi-channel analyzer 136, and a spectral analyzer 138. The data analysis and monitoring manager 132 and each of these aforementioned components 134, 136, 138 are discussed in greater detail below.

In one embodiment, a user interface 140, a manifest database 142, and a materials database 144 are communicatively coupled to the information processing system 130 either directly or via a network (e.g. a second network 131). The user interface 140, in one embodiment, comprises one or more displays, input devices, output devices, and/or the like, that allows a user to monitor and/or interact with the information processing system 130. The data and analysis functionality of the information processing system 130, which is discussed in greater detail below, can either be automated and/or supplemented with human interaction. The user interface(s) 140 enables this human interaction.

The manifest database 142 includes a plurality of manifests 146 associated with shipping cargo, which can be cargo on a water vessel, a ground vessel (e.g., cars, trucks, and/or trains), and/or an air transportation vessel. A manifest 146 includes a detailed description of the contents of each container or cargo that is to be examined by the detector sets 102, 104, 106, 108 and/or the neutron pulse device(s) 120. The manifests 146 are used by the information processing system 130 to determine whether the possible materials, goods, and/or products within the container package, car, truck, or the like match the expected authorized materials, goods, and/or products, described in the manifest 146 for the particular entity under examination. The use of a manifest 146 during examination of an entity is discussed in greater detail below.

The materials database 144 includes materials information 148 such as chemical material information, biological material information, radioactive material information, nuclear material information, and/or explosive material information. Also, the materials information 148 can include isotope information for known isotopes. For example, isotope information can include spectral images, histograms, energy levels, and/or the like associated with known isotopes. The materials information 148, in one embodiment, is used by the data analysis and monitoring manager 132 to determine whether any hazardous materials are within an entity that is being examined. This identification/detection process is discussed in greater detail below.

It should be noted that although the manifest database 142 and the materials database 144 are shown in FIG. 1 as being separate from the information processing system 130, one or more of these databases 142, 144 can reside within the information processing system 132 as well. Furthermore, the components of the information processing system 122 and the information processing system 130 can be implemented within a single information processing system as compared to multiple systems as shown in FIG. 1.

The operating environment 100, in one embodiment, also includes a remote monitoring information processing system 150 communicatively coupled to the second network 131. A user interface 152, which can be one or more displays, input devices, output devices and/or the like that allows a user to monitor and/or interact with the remote system 150. The remote monitoring system 150 includes a computer, memory, and storage and enables a user to remotely monitor and/or manage the data analysis and monitoring process being performed at the information processing system 130. Furthermore, the remote monitoring system 152 can be a device such as a wireless communication device, portable computer, desktop, and/or the like that receives notifications from the information processing system 130 regarding the data analysis and monitoring process.

It should be noted that the first and second networks 110, 131 can include any number of local area networks and/or wide area networks. It should be noted that even though FIG. 1 shows two networks 110, 131, a single network can be implemented or additional networks can be added. It should also be noted that the operating environment 100 can be fixed environment and/or a mobile environment. For example, the detector sets 102, 104, 106, 108 can be disposed on a cargo crane (e.g. on a spreader bar), on a structure that cargo containers pass under/over, on an automobile, on a flatbed of a truck, on a boat, on a cargo mover such as a forklift, or the like.

The data collection system 124 and the data analyzer and monitor 132 can be disposed on/at these locations as well or at remote locations.

DDS Detector Sets

Figure 2:
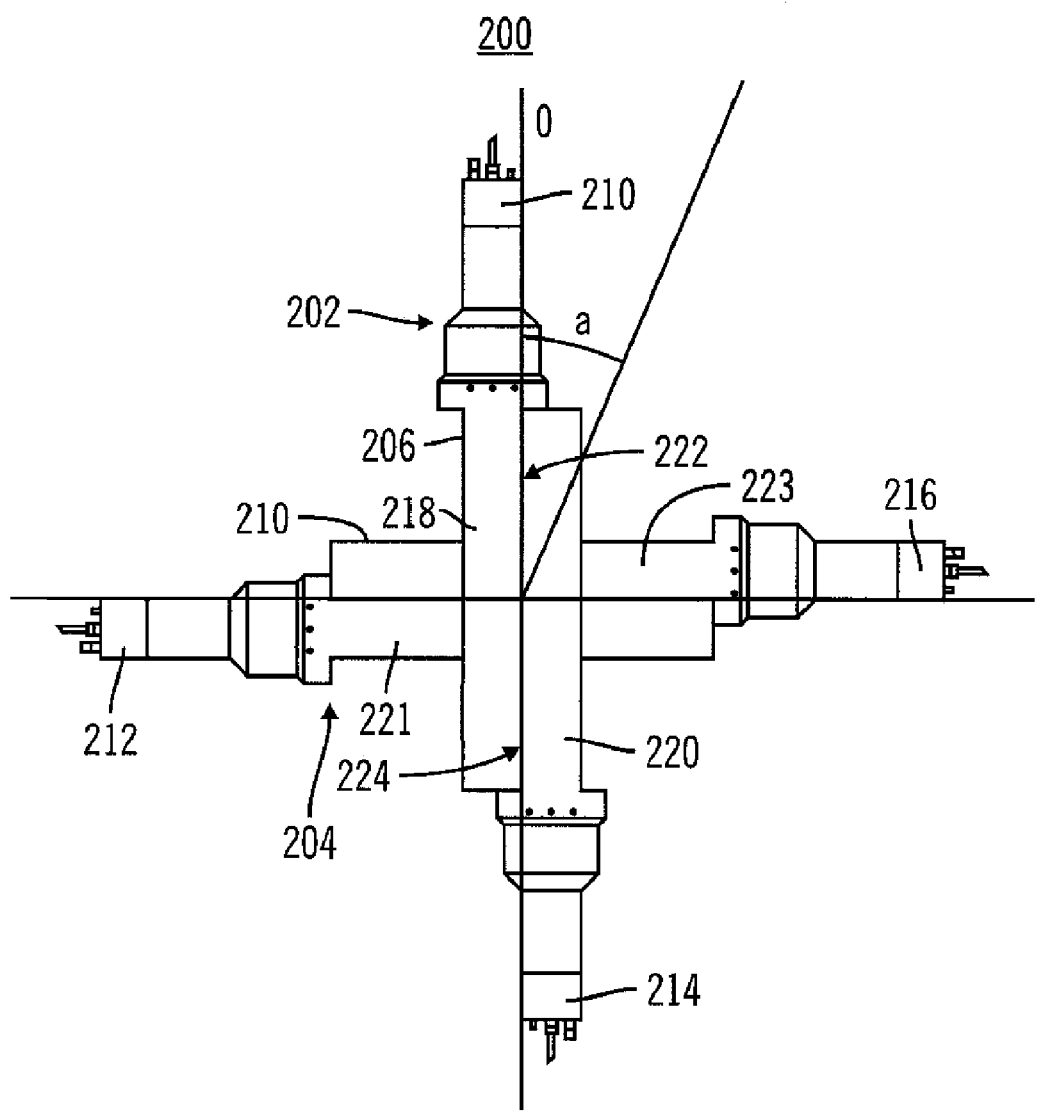
FIG. 2 is schematic of a radiation directional detection set according to one embodiment of the present invention.

FIG. 2 shows a more detailed view of a DDS detector set 200, as discussed above. In particular, FIG. 2 shows two detector sets 202, 204 coupled together to form a 360 degree DDS detector set 200. In one embodiment, a DDS detector set 202 includes a first sensor 206 and a second sensor 208. As discussed above, these sensors 206, 208 can be radiation sensors such as gamma ray sensors and/or neutron detectors. Each sensor 206, 208 includes a first end 210, 212, a second end 214, 216, and a body 218, 220, 221, 223 situated between the first end 210, 212 and the second end 214, 216.

A first portion 222 of the first sensor body 218 is coupled to a first portion 224 of the second sensor body 220 creating a back-to-back configuration as shown in FIG. 2. In other words, the first sensor body 218 is coupled to the first portion 224 of the second sensor body 220 so that the body portions 218, 220 are adjacent to each other. In one embodiment, the first sensor set 202 and the second sensor set 204 are situated with perpendicular to each other thereby creating substantially 90 degree angles between the detector sets 202, 204. It should be noted that FIG. 2 shows only one configuration applicable to the present invention and other configurations apply as well.

One advantage of coupling detectors 206, 208 within a detector set 202 so that the body portions 218, 220 are adjacent to each other is that this configuration provides mutual shielding between the two detectors 252, 254. Furthermore, this configuration creates an efficient directional detector which is more cost effective, weighs less, and is more compact than conventional methods. Also, this configuration enables ordinary detectors such as plastic scintillators, sodium iodide detectors, or any other detector without special characteristics such as the high energy resolution of Cerium Doped Lanthanum Bromide (LaBr3:Ce) scintillators to be used within the DDS detector sets.

Figure 3:
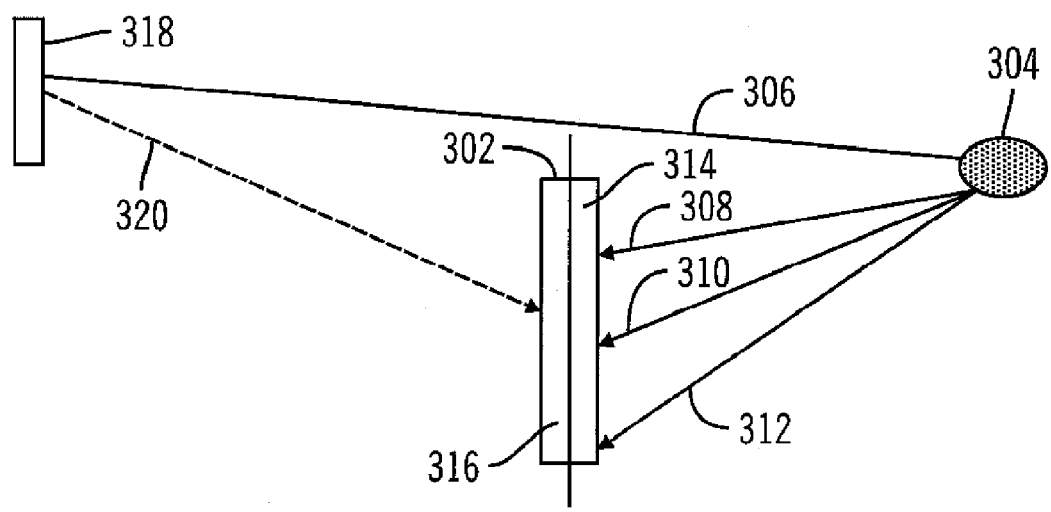
FIGS. 3-4 show illustrative examples of various configurations for radiation directional detector sets according to one embodiment of the present invention.
Figure 4:
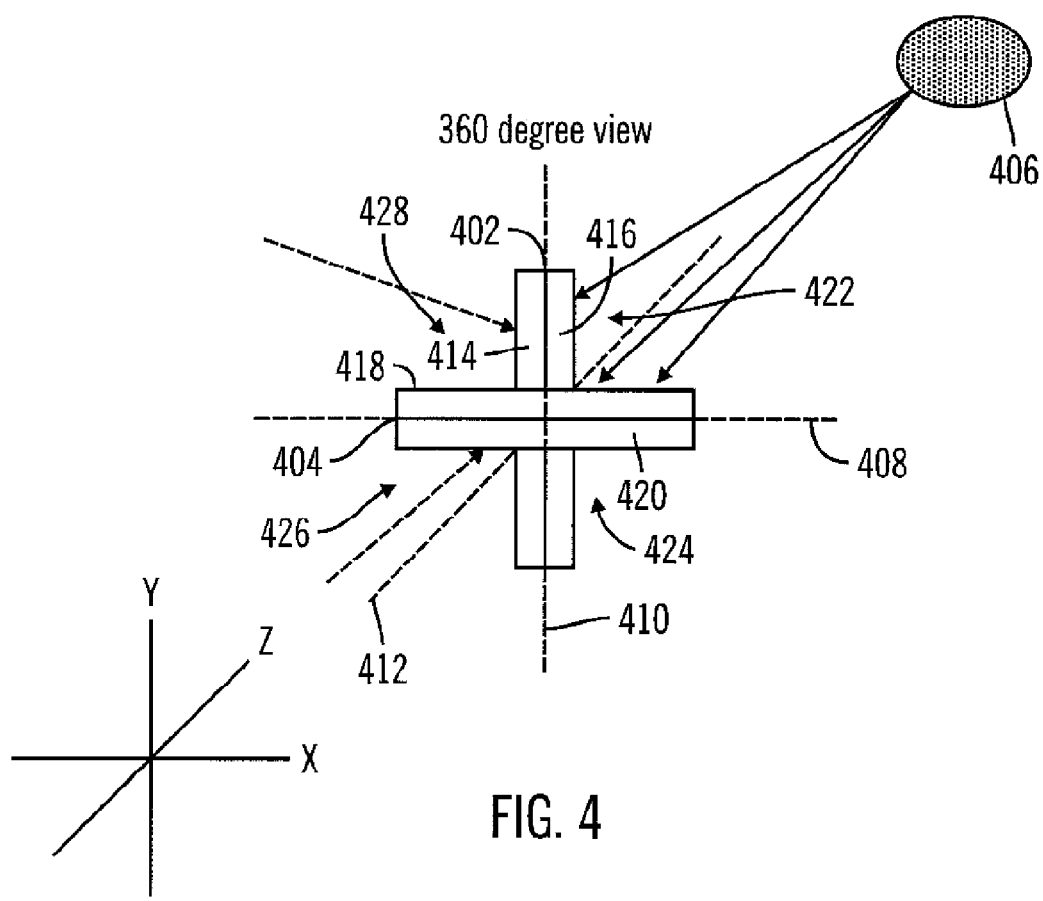

FIGS. 3 and 4 show illustrative examples of various DDS detector configurations. FIG. 3 shows a two component detector set 302 configured in a similar fashion as the detector set 202 discussed above with respect to FIG. 2. A radiation source 304 emits radiation denoted by lines 306, 308, 310, 312. A first detector 314 that is facing or is the closest to the radiation source 304 receives/senses a majority of the radiation emitted from the radiation source 304. The second detector 316, which is facing away from the radiation source 304 in this example, receives/senses a lesser amount of the radiation emitted from the radiation source 304. In other words, the partner detector, i.e., the first detector 314, of the second detector 316 shields the second detector 316 from the majority of the radiation signals. In one embodiment, the detectors 314, 316 detect gamma and/or neutron photons emitted by the radiation source 304 and maintain a gamma and/or neutron photon count of the photons detected.

In the example of FIG. 3, a portion 306 of the radiation emitted by the source 304 has been reflected off an entity 318 such as a structure, water, a vehicle, or the like, and then received by the second detector 316. The amount of reflected radiation 320 received/sensed by the second detector 316 would generally be less than the radiation 308, 310, 312 directly received/sensed by the first detector 314 from the source 304. This relative difference in radiation levels in the same energy fields detected by the detectors 314, 316 is used by the analysis and monitoring manager 132 to determine the direction of radiation emission and/or a direction to where the radiation source 304 is located.

FIG. 4 shows another example where two detector sets 402, 404 are coupled together as discussed above with respect to FIG. 2 for providing 360 degree directional detection. The DDS modules 402, 404 are positioned 90 degrees (e.g., situated in a substantially perpendicular configuration with respect to each other) apart creating a radiation directional finder ("RDF"). This configuration enables a two-dimensional 360 degree view for determining the specific direction that a radiation source 406 is emitting radiation energy from. Analysis of data from both DDS sets 402, 404, provides angular information of the direction of the radiation energy from the radiation source. A three-dimensional 360 degree view can be created by adding a third detector set (not shown) on the z-axis. For example, the first detector set 402 is disposed on the x-axis 408, the second detector set 404 is disposed on the y-axis 410, and a third detector set (not shown) is disposed on the z-axis 412.

The DDS detector sets 402, 404 enable the system 100 to determine a direction to the source of radiation without ambiguity. In one embodiment, the detectors 414, 416, 418, 420 are configured to absorb gamma rays by via Sodium Iodide (NaI) crystals within each detector/sensor. Also, the detectors 414, 416, 418, 420 can be configured to absorb neutrons as well. When two detectors 414, 416 (314, 316) are situated next to each other, the detector closest to the radiation source 406 absorbs a larger portion of the gamma rays, so the second detector has less number of gammas/neutrons hitting it. By comparing the number of counts at each detector 414, 416 in two back-to-back configured detectors, the data analysis and monitoring manager 132 determines in which half of a circle a source is located. The cross-section of the area is determined by two orthogonal "sandwiched" detectors. This narrows down the area to a quarter of a circle (90 degrees). For example, FIG. 4 shows a first quarter 422, a second quarter, 424, a third quarter 426, and a fourth quarter 428. To determine the direction of the source 406, the ratio in counts between two orthogonal back-to-back is combined together and analyzed.

As discussed above, the detector sets can be disposed in a mobile environment. In one embodiment, gamma detectors sets can be combined with neutron detectors sets in a distributed sensor network within a vehicle or marine vessel. In this embodiment, the gamma and neutron sensors are deployed on both sides of the vessel in multiple positions on each side. In a fixed environment such as a portal (e.g., a frame structure that vehicles/containers pass through, the gamma and neutron sensors are deployed on both sides of the vessel in multiple positions on each side to provide adequate coverage of the full vehicle/container lengths. The detectors/sensors can be configured as a horizontal portal across the centerline of the container to minimize the number of sensors required and to optimize the data acquisition times.

The spectral data 128 collected by each of the sensors 103, 105 within the detector arrays 102, 104, 106, 108 is used by the radiation directional analyzer 136 to determine a direction from which radiation is being emitted, detect radiation itself, and to identify materials emitting the radiation. For example, the radiation directional analyzer determines the direction of the radiation source, by combining together the energy ratio between two orthogonal back-to-back detectors and performing an analysis operation.

With respect to examining an entity to identify hazardous materials, as the detector sets 102, 104, 106, 108 scan the entity, each of the gamma and/or neutrons sensors can generate signals indicative of any gamma and/or neutron radiation detected. As discussed above, this sensor data 128 is collected by the data collection manager 132 and stored within one or more data storage units 126. The data analysis and monitoring manager 132 then analyzes the data 128 to determine if any hazardous materials have been detected.

For example, the data analysis and monitoring manager 132 includes a multi-channel analyzer ("MCA") 136 comprising one or more devices a device composed of multiple single channel analyzers ("SCA"). In one embodiment, the MCA 136, uses analog to digital converters combined with computer memory that is equivalent to thousands of SCAs and counters and is dramatically more powerful and cost efficient than individual SCAs. The SCA interrogates analog signals received from the individual radiation detectors 103, 105, and determines whether the specific energy range of the received signal is equal to the range identified by the single channel. If the energy received is within the SCA an SCA counter is updated. Over time, the SCA counts are accumulated. At a given time interval, a multi-channel analyzer 136 includes a number of SCA counts, which result in the creation of a histogram 154.

The histogram 154, according to one embodiment, represents the spectral image of the radiation that is present within the entity being examined. In other words, the histogram 154 is a fingerprint of the entity being examined. The histogram 154 can represent a portion of the entity or the entire entity. In one embodiment, a single histogram 154 can be created based on information received from all of the detector arrays 102, 104, 106, 108. In another embodiment, a single histogram 154 can be created from the combination of one or more histograms associated with one or more detectors 103, 105 in the detector arrays 102, 104, 106, 108. In yet another embodiment, a histogram 154 can be created for each sensor 103, 105 within the sensor arrays 102, 104. A more detailed discussion on histograms is given in U.S. Pat. No. 7,142,109 entitled "Container Verification System For Non-Invasive Detection Of Contents", filed on Feb. 27, 2006; and U.S. Pre-Grant Publication 2008/0048872 entitled, "Multi-Stage System For Verification Of Container Contents", filed on Oct. 31, 2007; and which collective teachings thereof are hereby incorporated by reference in their entirety.

In the present example, the histogram 154 is used by the spectral analyzer 138 to identify isotopes that are present in materials residing within the entity under examination. One of the functions performed by the data and analysis manager 132 is spectral analysis, performed by the spectral analyzer 138, to identify the one or more isotopes, explosives or special materials residing within the entity under examination. With respect to radiation detection, the spectral analyzer 138 compares one or more spectral images (e.g., histograms 154) of the radiation that has been detected within the entity to known isotopes that are represented by one or more spectral images stored 148 in the materials database 144. By capturing multiple variations of spectral data for each isotope there are numerous images that can be compared to one or more spectral images of the detected radiation present.

The materials database 144 contains material information 148 such as one or more spectral images 148 of each isotope to be identified. These multiple spectral images represent various levels of acquisition of spectral radiation data so isotopes can be compared and identified using various amounts of spectral data available from the one or more sensors. Whether there are small amounts or large amounts of data acquired from the sensor, the spectral analyzer 138 compares the acquired radiation data from the detector 103, 105 to one or more spectral images 148 for each isotope to be identified. This significantly enhances the reliability and efficiency of matching acquired spectral image data from the sensor to spectral image data of each possible isotope to be identified.

Once one or more possible isotopes are determined to be present in the radiation detected by the detector(s) 103, 105, the data analysis and monitoring manager 132 compares the isotope mix against possible materials, goods, and/or products that may be present in the entity under examination. The manifest database 142 includes a detailed description 146 of the contents of each entity 210 that is to be examined. The manifest 146 can be referred to by the data analysis and monitoring manager 132 to determine whether the possible materials, goods, and/or products, contained in the entity 210 match the expected authorized materials, goods, and/or products, described in the manifest 146 for the particular container under examination. This matching process, according to one embodiment of the present invention, is significantly more efficient and reliable than any container contents monitoring process has been in the past.

It should be noted that the spectral analyzer 138 is able to utilize various methods to provide multi-confirmation of the isotopes identified. Should more than one isotope be present, the spectral analyzer 138 identifies the ratio of each isotope present. Examples of methods that can be used for spectral analysis, such as that discussed above, include: 1) a margin setting method as described in U.S. Pat. No. 6,847,731 entitled "Method And System For Improving Pattern Recognition System Performance", filed Aug. 7, 2000, which is hereby incorporated by reference in its entirety; and 2) a LINSCAN method (a linear analysis of spectra method) as described in U.S. Provisional patent application Ser. No. 11/624,067, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference.

With respect to analysis of collected data pertaining to explosives and/or special materials, the spectral analyzer 138 compares identified possible explosives and/or special materials to the manifest 148 by converting the stored manifest data 148 relating to the entity under examination to expected explosives and/or radiological materials and then by comparing the identified possible explosives and/or special materials with the expected explosives and/or radiological materials. If the system determines that there is no match to the manifest 148 for the entity then the identified possible explosives and/or special materials are unauthorized. The system can then provide information to system supervisory personnel to alert them to the alarm condition and to take appropriate action. For example, the user interface 140, 152 can present to a user a representation of the collected received returning signals, or the identified possible explosives and/or special materials in the entity under examination, or any system identified unauthorized explosives and/or special materials contained within the entity under examination, or any combination thereof.

A more detailed discussion on spectral analysis is given in U.S. Pat. No. 7,142,109 entitled "Container Verification System for Non-Invasive Detection of Contents", filed on Feb. 27, 2006; and U.S. Pre-Grant Publication 2008/0048872 entitled, "Multi-Stage System For Verification Of Container Contents", filed on Oct. 31, 2007; and which collective teachings thereof being hereby incorporated by reference in their entirety.

In addition to gamma and neutron sensors, neutron pulse devices 120 can also be deployed on a structure such as a vehicle, shuttle carrier, or the like as discussed above. The neutron pulse devices 120 include coincident counting capabilities. The gamma detectors within the neutron pulse device are used to identify chemical and explosives materials from the gamma response to the neutron pulse. The neutron detectors are used to identify shielded nuclear materials from the response.

The micro-neutron pulse device(s) 120 creates an active detection system that is deployed on structure that enable the identification of chemical, nuclear and explosives materials based on the response from the neutron pulse. These non-intrusive inspection systems can interrogate entities for the detection of shielded nuclear materials while maintaining a high hourly throughput in ports of entry, ports of departure, borders and other checkpoints. A more detailed discussion on using micro-neutron pulse devices is provided in the provisional U.S. Patent Application No. 61/128,115, entitled "Mobile Frame Structure With Passive/Active Sensor Arrays For Non-Invasive Analysis For CBRNE Materials Present", filed on May 19, 2008, by the same inventor as the present application, and which is hereby incorporated by reference in its entirety.

As can be seen form the above discussion, a plurality of radiation detectors that are coupled together in a back-to-back configuration are used to create a directional detector. These directional detectors do not require any addition of shielding material, as each back-to-back coupled detector acts as a shield for an opposing detector. By using two sets of back-to-back coupled detectors, with each set aligned at substantially 90 degrees to the other, the detection data from all of the detectors can be used to detect radiation at stand-off distances (such as at least 100 feet or more) in a 360-degree view and to determine the direction of the radiation source that is emitting the radiation energy being detected.

Example of a Process for Radiation Direction Identification

Figure 5:
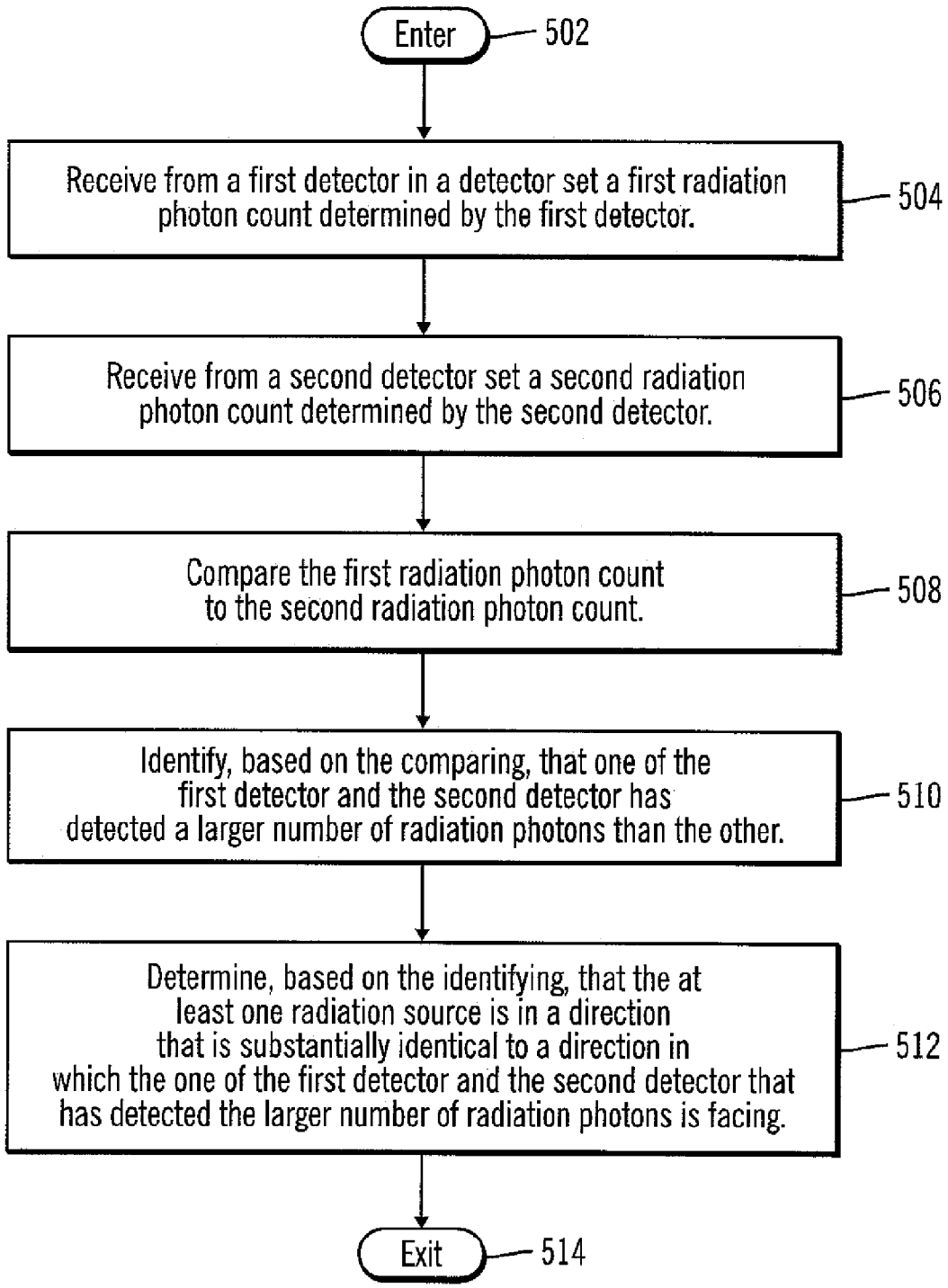
FIG. 5 is an operational flow diagram illustrating one process of determining the direction from which radiation is emanating according to one embodiment of the present invention.

FIG. 5 is an operational flow diagram illustrating one process of determining the direction from which radiation is emanating. The operational flow diagram starts at step 502 and flows directly into step 504. The data analysis and monitoring manager 135, at step 504, receives from a first detector 103 in a detector set 102, a first radiation photon count (e.g., gamma particle count and/or neutron particle count) determined by the first detector 103. The first radiation photon count is associated with at least one radiation source 308. The manager 132, at step 506, receives from a second detector 105 in the detector set 102, a second radiation photon count (e.g., gamma particle count and/or neutron particle count) determined by the second detector 103. The second radiation photon count is associated with the at least one radiation source 308.

The manager 132, at step 508, compares the first radiation photon count to the second radiation photon count. The manager 132, at step 510, identifies, based on the comparing, that one of the first detector 103 and the second detector 105 has detected a larger number of radiation photons than the other. The manager 132, at step 512, determines, based on the identifying, that the at least one radiation source is in a direction that is substantially identical to a direction in which the one of the first detector and the second detector that has detected the larger number of radiation photons is facing. The control flow then exits at step 514.

Information Processing System

Figure 6:
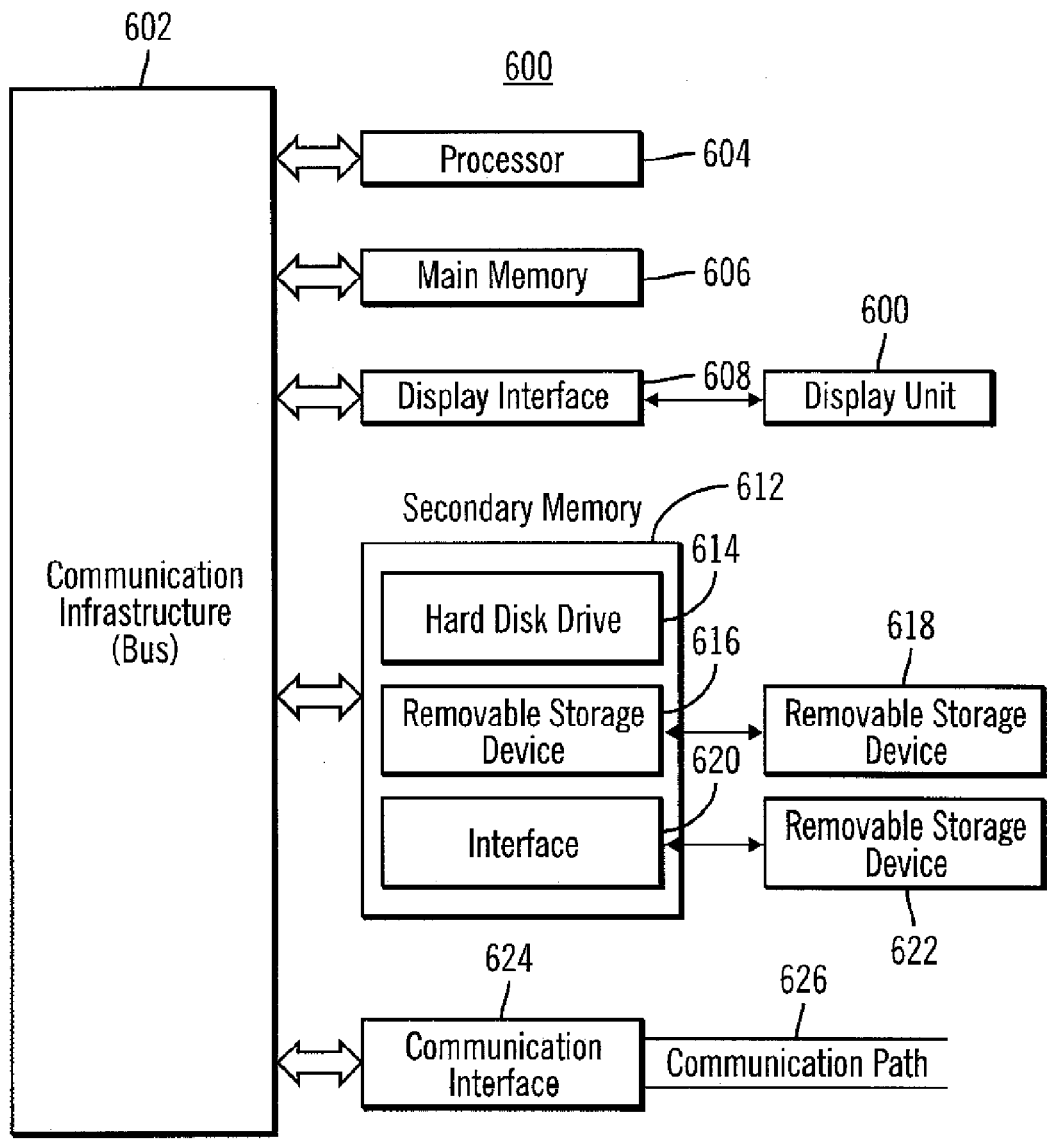
FIG. 6 is a block diagram illustrating a detailed view of an information processing system, according to one embodiment of the present invention.

FIG. 6 is a high level block diagram illustrating a more detailed view of a computing system 600 such as the information processing system 130 useful for implementing the data and analysis manager 132 according to the various embodiments of the present invention. The computing system 600 is based upon a suitably configured processing system adapted to implement an exemplary embodiment of the present invention. For example, a personal computer, workstation, or the like, may be used.

In one embodiment of the present invention, the computing system 600 includes one or more processors, such as processor 604. The processor 604 is connected to a communication infrastructure 602 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 600 can include a display interface 608 that forwards graphics, text, and other data from the communication infrastructure 602 (or from a frame buffer) for display on the display unit 610. The computing system 600 also includes a main memory 606, preferably random access memory (RAM), and may also include a secondary memory 612 as well as various caches and auxiliary memory as are normally found in computer systems. The secondary memory 612 may include, for example, a hard disk drive 614 and/or a removable storage drive 616, representing a floppy disk drive, a magnetic tape drive, an optical disk drive, and the like. The removable storage drive 616 reads from and/or writes to a removable storage unit 618 in a manner well known to those having ordinary skill in the art.

Removable storage unit 618, represents a floppy disk, a compact disc, magnetic tape, optical disk, etc. which is read by and written to by removable storage drive 616. As are appreciated, the removable storage unit 618 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 612 may include other similar means for allowing computer programs or other instructions to be loaded into the computing system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computing system 600.

The computing system 600, in this example, includes a communications interface 624 that acts as an input and output and allows software and data to be transferred between the computing system 600 and external devices or access points via a communications path 626. Examples of communications interface 624 may include a modem, a network interface (such as an Ethernet card), a communications port, a PCMCIA slot and card, etc. Software and data transferred via communications interface 626 are in the form of signals which may be, for example, electronic, electromagnetic, optical, or other signals capable of being received by communications interface 624. The signals are provided to communications interface 624 via a communications path (i.e., channel) 626. The channel 626 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 606 and secondary memory 612, removable storage drive 616, and a hard disk installed in hard disk drive 614. The computer program products are means for providing software to the computer system. The computer readable medium allows the computer system to read data, instructions, messages or message packets, and other computer readable information from the computer readable medium.

Computer programs (also called computer control logic) are stored in main memory 606 and/or secondary memory 612. Computer programs may also be received via communications interface 624. Such computer programs, when executed, enable the computer system to perform the features of the various embodiments of the present invention as discussed herein. In particular, the computer programs, when executed, enable the processor 604 to perform the features of the computer system.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:
1. A method for determining a direction associated with gamma and/or neutron radiation emissions from a radiation source at stand-off distances, the method comprising:
receiving from a first detector in a detector set, a first radiation photon count associated with the first detector, wherein the first radiation photon count is associated with at least one radiation source located at a stand-off distance from the first detector;
receiving from a second detector in the detector set, a second radiation photon count associated with the second detector, wherein the second radiation photon count is associated with the at least one radiation source which is located at a stand-off distance from the second detector;
comparing the first radiation photon count to the second radiation photon count;
identifying, based on the comparing, that one of the first detector and the second detector has detected a larger number of radiation photons than the other; and
determining, based on the identifying, that the at least one radiation source is in a direction that is substantially identical to a direction in which the one of the first detector and the second detector that has detected the larger number of radiation photons is facing.

2. The method of claim 1, wherein the first detector and the second detector are coupled together in a configuration such that each detector shields the other detector from detected radiation emissions.

3. The method of claim 2, wherein the configuration includes:

a body portion of the first detector being mechanically coupled to a body portion of the second detector so that the first detector and the second detector are adjacent to each other, and wherein a sensing portion of the first detector and a sensing portion of the second detector face opposite directions.

4. The method of claim 1, wherein the first and second radiation photon count comprise a gamma particle radiation photon count.

5. The method of claim 1, wherein the first and second radiation photon count comprise a neutron particle radiation photon count.

6. The method of claim 1, further comprising:
receiving from a third detector in at least one additional detector set, a third radiation photon count associated with the third detector, wherein the third radiation photon count being associated with the at least one radiation source which is located at a stand-off distance from the third detector; and
receiving from at least a fourth detector in the at least one additional detector set, at least a fourth radiation photon count associated with the at least fourth radiation detector, wherein the at least fourth radiation photon count is associated with the at least one radiation source which is located at a stand-off distance from the fourth detector.

7. The method of claim 6, wherein the third detector and the at least fourth detector are coupled together in a configuration such that each detector shields the other detector from detected radiation emissions.

8. The method of claim 7, wherein the configuration includes:
a body portion of the third detector being mechanically coupled to a body portion of the at least fourth detector so that the third detector and the at least fourth detector are adjacent to each other, and wherein a sensing portion of the third detector and a sensing portion of the at least fourth detector face opposite directions.

9. The method of claim 6, wherein the detector set and the at least one additional detector set being situated with respect to each other in a configuration creating
a first quadrant between a first portion of the first detector and a first portion of the third detector,
a second quadrant between a second portion of the first detector and a first portion of the fourth detector,
a third quadrant between a first portion of the second detector and a second portion of the fourth detector, and
a fourth quadrant between a second portion of the second detector and a second portion of the third detector.

10. The method of claim 9, wherein the first portion of the first detector and the first portion of the third detector are situated substantially perpendicular with respect to each other, and
wherein the second portion of the first detector and the first portion of the fourth detector are situated substantially perpendicular with respect to each other, and
wherein the first portion of the second detector and the second portion of the fourth detector are situated substantially perpendicular with respect to each other, and
wherein the second portion of the second detector and the second portion of the third detector are situated substantially perpendicular with respect to each other.

11. The method of claim 9, further comprising:
comparing the first radiation photon count to the second radiation photon count, and comparing the third photon radiation count to the at least fourth radiation photon count;
identifying, based on the comparing, which of the first and second detectors comprises the largest radiation photon count, and which of the third and at least fourth detectors comprises the largest radiation photon count;
determining, based on the identifying, one of the first, second, third, and fourth quadrants that corresponds to the two detectors that have been identified; and
determining that the at least one radiation source is located in a direction associated with the quadrant that has been determined.

12. A radiation direction finder system, for determining a direction associated with gamma and/or neutron radiation emitted from an object, the system comprising:
at least one frame structure comprising at least a first portion and a second portion configured to be located relative to an object;
at least one set of radiation detectors mechanically coupled to the at least one frame structure, wherein the at least one set of radiation detectors includes a first detector and at least a second detector, wherein the first detector and the at least second detector are mechanically coupled together in a configuration such that each detector shields the other detector from detected radiation emissions, and wherein a body portion of the first detector is mechanically coupled to a body portion of the at least second detector so that the first detector and the at least second detector are adjacent to each other, and wherein a sensing portion of the first detector and a sensing portion of the at least second detector face opposite directions; and
at least one information processing system coupled to the at least one set of radiation detectors, wherein the at least one information processing system is adapted to:
receive from a first detector in a detector set, a first radiation photon count determined by the first detector, wherein the first radiation photon count is associated with at least one radiation source associated with an object;
receive from a second detector in the detector set, a second radiation photon count determined by the second detector, wherein the second radiation photon count is associated with the at least one radiation source associated with the object;
compare the first radiation photon count to the second radiation photon count;
identify, based on the first radiation photon count being compared to the second radiation photon count, that one of the first detector and the second detector has detected a larger number of radiation photons than the other; and
determine, based on identifying that one of the first detector and the second detector has detected a larger number of radiation photons than the other, that the at least one radiation source is in a direction that is substantially identical to a direction in which the one of the first detector and the second detector that has detected the larger number of radiation photons is facing.

13. The system of claim 12, wherein the first detector and the at least second detector comprise one of a gamma radiation sensor and a neutron radiation sensor.

14. The system of claim 12, further comprising:
at least one additional set of radiation detectors being situated in a perpendicular configuration with respect to the at least one set of radiation detectors, wherein the at least one additional set of radiation detectors includes a third detector and at least a fourth detector, wherein the third detector and the at least fourth detector are mechanically coupled together in a configuration such that each detector shields the other detector from detected radiation emissions, and wherein a body portion of the third detector is mechanically coupled to a body portion of the at least fourth detector so that the third detector and the at least second fourth are adjacent to each other, and wherein a sensing portion of the third detector and a sensing portion of the at least fourth detector face opposite directions.

15. The system of claim 14, wherein the information processing system is further adapted to:
receive from the third detector, a third radiation photon count determined by the third detector, wherein the third radiation photon count is associated with the at least one radiation source;
receive from the at least fourth detector, at least a fourth radiation photon count determined by the at least fourth detector, wherein the at least fourth radiation photon count is associated with the at least one radiation source;
compare the first radiation photon count to the second radiation photon count, and compare the third photon radiation count to the at least fourth radiation photon count;
identify, based on the comparing, which of the first and second detectors comprises the largest radiation photon count, and which of the third and at least fourth detectors comprises the largest radiation photon count;
determining, based on the identifying, one of the first, second, third, and fourth quadrants that corresponds to the two detectors that have been identified; and
determining that the at least one radiation source is located in a direction associated with the quadrant that has been determined.

16. The system of claim 12, wherein the first and second first radiation photon count is one of a gamma radiation photon count and a neutron radiation photon count.

17. A system for determining a direction associated with gamma and/or neutron radiation emitting from an object, the system comprising:
at least one vehicle;
at least one set of radiation detectors mechanically coupled to the at least one vehicle, wherein the at least one set of radiation detectors includes a first detector and at least a second detector, wherein the first detector and the at least second detector are mechanically coupled together in a configuration such that each detector shields the other detector from detected radiation emissions, and wherein a body portion of the first detector is mechanically coupled to a body portion of the at least second detector so that the first detector and the at least second detector are adjacent to each other, and wherein a sensing portion of the first detector and a sensing portion of the at least second detector face opposite directions;
at least one network; and
at least one information processing system communicatively coupled to the at least one network and the at least one set of radiation detectors, wherein the at least one information processing system is adapted to:
receive from a first detector in a detector set, a first radiation photon count associated with the first detector, wherein the first radiation photon count is associated with at least one radiation source;
receive from a second detector in the detector set, a second radiation photon count determined by the second detector, wherein the second radiation photon count is associated with the at least one radiation source;
compare the first radiation photon count to the second radiation photon count;
determining, based at least on the first radiation photon count being compared to the second radiation photon count, that the at least one radiation source is in a direction in which the one of the first detector and the second detector is substantially facing.

18. The system of claim 17, wherein the first detector and the at least second detector comprise at least one of a gamma radiation sensor and a neutron radiation sensor.

19. The system of claim 17, further comprising:
at least one additional set of radiation detectors mechanically coupled to the at least one vehicle and situated in a substantially perpendicular configuration with respect to the at least one set of radiation detectors, wherein the at least one additional set of radiation detectors includes a third detector and at least a fourth detector, wherein the third detector and the at least fourth detector are mechanically coupled together in a configuration such that each detector shields the other detector from detected radiation emissions, and wherein a body portion of the third detector is mechanically coupled to a body portion of the at least fourth detector so that the third detector and the at least second fourth are adjacent to each other, and wherein a sensing portion of the third detector and a sensing portion of the at least fourth detector face opposite directions.

20. The system of claim 19, wherein the information processing system is further adapted to:
receive from the third detector, a third radiation photon count determined by the third detector, wherein the third radiation photon count is associated with the at least one radiation source;
receive from the at least fourth detector, at least a fourth radiation photon count determined by the at least fourth detector, wherein the at least fourth radiation photon count is associated with the at least one radiation source;
compare the third radiation photon count to the fourth radiation photon count;
determine, based at least on the first radiation photon count being compared to the second radiation photon count and the third radiation photon count being compared to the fourth radiation photon count, that the at least one radiation source is located in a direction in which contemporaneously
one of the first detector and the second detector is substantially facing, and
one of the third detector and fourth detector is substantially facing.

* * * * *